United States Patent
Parks et al.

(10) Patent No.: US 6,539,772 B1
(45) Date of Patent: Apr. 1, 2003

(54) METHOD AND SYSTEM FOR TESTING EMERGENCY WATER SYSTEM PRESSURE

(76) Inventors: Rickey C. Parks, 2011 Habersham Cir., Covington, GA (US) 30014; Lamar Chandler, 3592 Dalley Rd., Covington, GA (US) 30014; Michael Pettis, 20 Oak Lake Ct., Covington, GA (US) 30016

( * ) Notice: Subject to any disclaimer, the term of this patent is extended or adjusted under 35 U.S.C. 154(b) by 0 days.

(21) Appl. No.: 09/448,745

(22) Filed: Nov. 24, 1999

(51) Int. Cl.⁷ .................................................. G01L 27/00
(52) U.S. Cl. ............................................ 73/1.72; 73/1.57
(58) Field of Search ................................. 73/1.57, 1.71, 73/1.72, 714, 195, 199

(56) References Cited

U.S. PATENT DOCUMENTS 4,527,415 A * 7/1985 Chabat-Courrede ......... 73/1.72

* cited by examiner

Primary Examiner—Harshad Patel
(74) Attorney, Agent, or Firm—Baker, Donelson, Bearman & Caldwell

(57) ABSTRACT

An emergency water system testing system (20) is provided which includes a retaining tank (21) having inlet conduits (23 and 24), a vent (25), and an outlet conduit (26). The testing system also includes a support carriage (33) having four lockable wheels (34) and a flow measuring device (36). The system may be coupled to the coupler valve (14) of an emergency water system (12) so that water expelled from the emergency water system is contained on sight while the flow rate of the water is determined. In this manner the water expelled from the water system may then be moved to a remote location and controllably discharged.

12 Claims, 1 Drawing Sheet

METHOD AND SYSTEM FOR TESTING EMERGENCY WATER SYSTEM PRESSURE

TECHNICAL FIELD

This invention relates to a method of in situ testing the water flow and pressure at the outlet valves of a building's emergency water system and a system for testing such.

BACKGROUND OF THE INVENTION

Large buildings are required to have emergency water systems in case of fire. These emergency water systems provide water to the fire sprinkler system dispersed throughout the building as well as an emergency outlet system adapted to be coupled to the fire hoses of a fire department. As shown in FIG. 1, the typical emergency outlet system has a vertical stand pipe coupled to a municipal water main. The system also includes a shut off valve coupled to the stand pipe which controls the flow of water throughout the system and a series of outlet or hose coupler valves adapted to receive end of a conventional fire hose and control the flow of water to the fire hose.

Buildings having multiple floors obviously require sufficient water pressure and flow to be provided to the coupler valves of the upper floors of the buildings. This however significantly increases the water pressure at the coupler valves of the lower floors. Should the water pressure exceed a selected acceptable level, approximately 175 psi, a fire hose attached to the coupler valve may be uncontrollable, thereby causing a great potential harm or even death. As such, wherein the water pressure exceeds a maximum pressure the coupler valves include a pressure reducing valve which lowers the water pressure expelled from the coupler valve to the acceptable level.

As part of the safety measure of the emergency water system the flow rate of water at each floor's outlet coupler valve must be periodically tested to insure it is within an acceptable flow range. In the past, the only method of testing the pressure reducing valve was to shut off the stand pipe control valve and drain the stand pipe so that the coupler valve could be removed. Once the coupler valve was removed it was tested at a remote location. This requires that the emergency water system be inoperable while the coupler valve is removed. To minimize this inoperable time period a replacement coupler valve oftentimes replaces the coupler valve to be tested. This however is impractical when a building contains several outlet coupler valves which must each be tested. Furthermore, the shutting off of any emergency system for a time period, no matter how short, creates a dangerous situation.

It thus is seen that a need remains for a method and apparatus of testing an emergency water system of a building in an effective manner that will not jeopardize the safety of individuals by rendering the system inoperable during the testing phase. Accordingly, it is to the provision of such that the present invention is primarily directed.

SUMMARY OF THE INVENTION

In a preferred form of the invention a method of in situ testing of the water pressure at the outlet valve of a building's emergency water system comprises the steps of coupling a water flow measuring device to the outlet valve, opening the outlet valve to allow the flow of water therefrom, measuring the water flow through the water flow measuring device, and containing the water flow passing through the flow measuring device within a movable retaining tank.

In another preferred form of the invention, a water flow testing system for determining the water pressure at the outlet valve of a building's water distribution system comprises a retaining tank adapted to contain a volume of water therein, an inlet conduit coupled to the retaining tank, and an outlet conduit coupled to the retaining tank. The outlet conduit has a control valve to control the flow of water from said tank. The testing system also has a water flow measuring device coupled to the inlet conduit and the outlet valve, and a plurality of wheels. With this construction, the outlet valve may be opened to allow a flow of water through the water measuring device and into the retaining tank at the location of the outlet valve, the retaining tank may then be moved to a draining location wherein the water within the retaining tank is released through the outlet conduit through actuation of the control valve.

DETAILED DESCRIPTION

Figure 1:
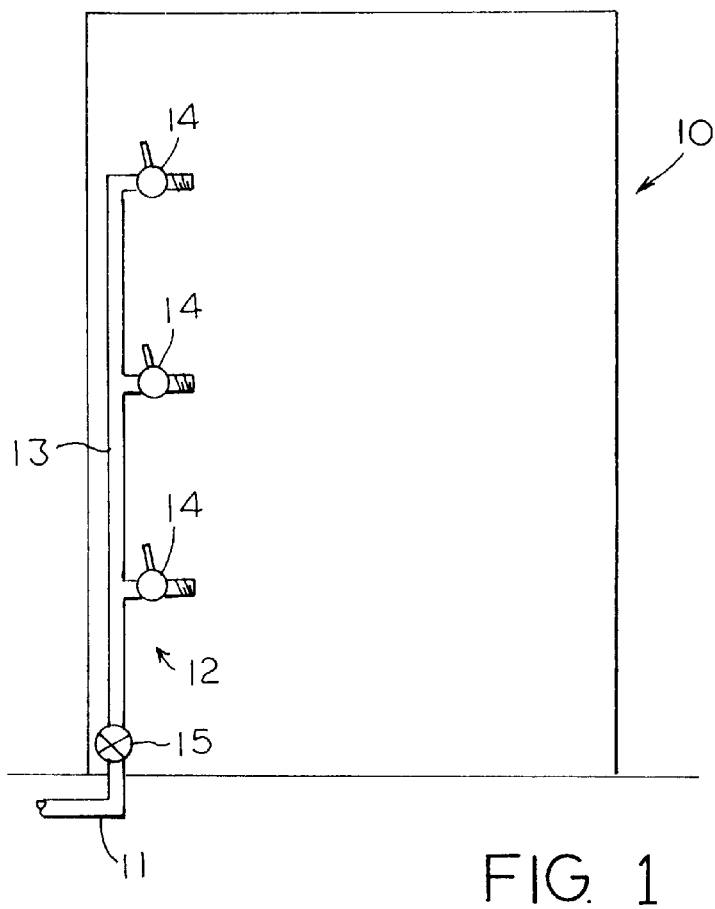
FIG. 1 is a schematic diagram of a multiple story building having an emergency water system.

With reference next to the drawing, there is shown in FIG. 1 a typical multiple story building 10 wherein a water main 11 is coupled to a water emergency outlet system 12. The emergency outlet system 12 includes a vertical stand pipe 13 and a series of outlet coupler valves 14 adapted to receive a fire hose. A main shut-off valve 15 coupled to the stand pipe 13 controls the flow of water throughout the system 12. Depending upon the water pressure requirements on the upper floors of the building the coupler valves 14 of the lower floors may also include pressure reducing valves which reduce the water pressure to an acceptable level, generally below 175 p.s.i.

Figure 2:
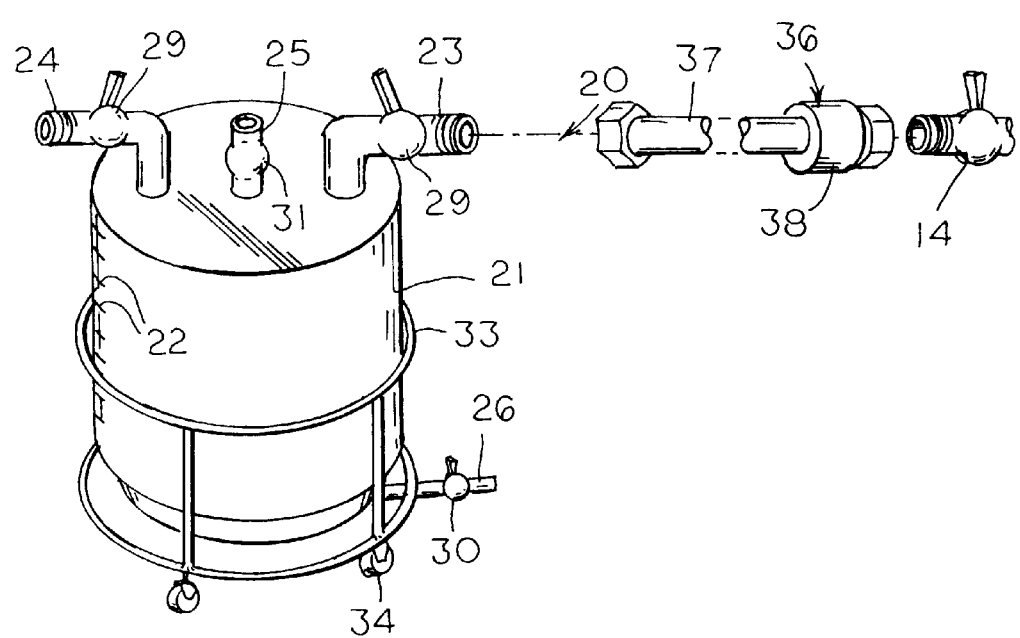
FIG. 2 is a perspective view of a system for testing the emergency water system of a building.

With reference next to FIG. 2, there is shown a water flow testing system 20 in a preferred form of the invention. The testing system 20 includes a generally cylindrical, translucent, retaining tank 21 having a truncated or beveled lower portion 22. The retaining tank 21 has a 400 gallon capacity and has a series of quantity indicating marks 22 on the side wall of the tank whereby the water level and thereby quantity of water within the tank may be determined. The tank 21 has a 2 ½ inch, threaded, inlet conduit 23, a 1 ½ inch, threaded inlet conduit 24, a vent 25, and a lower, outlet conduit 26. The inlet conduits 23 and 24 each have a control valve 29 to control the flow of water therethrough. Similarly, the lower outlet conduit 26 has a control valve 30 which controls the flow of water expelled from the retaining tank 21. The vent 25 has a water prevention or check valve 31 therein which allows the passage of air but prevents the passage of water, such as a conventional floating ball type valve.

The testing system 20 includes a support carriage 33 adapted to support the retaining tank 21. The carriage 33 has four lockable wheels 34 which enables the system to be moved upon a surface. The testing system 20 also includes a flow measuring device 36 having an approximately 6 foot length of linking hose 37 coupled to a peto gauge 38, such as that made by Potter Roemer, Inc. of Atlanta, Ga., which measures the flow of water.

In use, the testing system 20 is rolled to the location of the first outlet coupler valve 14 to be tested. The peto gauge 38 is threadably mounted to the outlet coupler valve 14 while the attached linking hose 37 is threaded onto the same sized inlet conduit 23 or 24, i.e. if the building coupler valve has a 2 ½ inch diameter the 2 ½ inch diameter conduit inlet 23 is utilized. The control valve 29 to the utilized inlet conduit 23 or 24 is opened while the control valve 29 of the un-utilized inlet conduit and control valve 30 of the outlet conduit 26 are maintained in closed positions. Once the testing system 20 is coupled to the coupler valve 14 the carriage wheels 34 are locked to prevent movement of the system during testing.

Next, the building's coupler valve 14 is opened so as to cause water to flow from the coupler valve 14, through the peto gauge 38, linking hose 37 and utilized inlet conduit 23 or 24 and into the retaining tank 21. As water occupies the volume within the retaining tank 21 air contained therein is expelled through vent 25. Once the water has flowed through the measuring device 36 a sufficient time to allow an accurate flow reading to be indicated by the peto gauge 38 the building's coupler valve 14 is closed to shut off the flow of water to the system.

The peto gauge 38 is then be removed from the building's coupler valve 14. Once this is done, the wheels 34 are unlocked and the system 20 is moved to a dumping location, typically the maintenance room located on each floor of a building, whereby the outlet conduit control valve 30 is opened so that the water within the retaining tank 21 may be slowly and controllably expelled from the retaining tank and into a drain, typically found in the floor of the maintenance room.

It should be understood that as an alternative to the use of a peto gauge the operator may open the coupler valve 14 for a designated time period and then determine the quantity of water within the retaining tank through the quantity indicating marks 22. Once this is accomplished the operator may mathematically calculate the flow rate of the water passing through the coupler valve. This however is not as accurate a measurement as that obtained through a peto gauge because of variations in flow rates during the testing process. It should also be understood that other types of calibration means may be utilized as an alternative to the marking on the side walls of the retaining tank, such as mechanical liquid measuring devices and the like.

It thus is seen that a means and a method are now provided for testing the flow and pressure of an emergency water system and a method of testing the coupler valve and pressure reducing valve in a manner that does not render the system inoperable during testing. It should of course be understood that many modifications may be made to the specific preferred embodiment described herein without departure from the spirit and scope of the invention as set forth in the following claims.

What is claimed is:

1. A method of in situ testing of the water pressure exiting the outlet valve of a building's emergency water system comprising the steps of:
    (a) coupling a water flow measuring device to an outlet end of an operational outlet valve;
    (b) opening the outlet valve to allow the flow of water therefrom;
    (c) measuring the water flow through the water flow measuring device, and
    (d) containing the water flow passing through the flow measuring device into a movable retaining tank located adjacent the outlet valve.

2. The method of claim 1 further comprising the steps of (e) relocating the movable retaining tank to a water releasing sight, and (f) releasing the contained water from the retaining tank.

3. The method of claim 1 further comprising the step of venting the retaining tank as the water flows into the retaining tank.

4. A method of in situ testing of the water pressure exiting an operational outlet valve of a building's emergency water system comprising the steps of:
    (a) providing a retaining tank having an inlet and an outlet;
    (b) coupling a water flow measuring device to the inlet of the retaining tank and to an outlet end of an operational outlet valve;
    (c) opening the outlet valve to allow the flow of water therethrough;
    (d) measuring the water flow through the water flow measuring device, and
    (e) containing the water flow passing through the outlet valve and the water flow measuring device into the retaining tank.

5. The method of claim 4 further comprising the steps of (f) relocating the retaining tank to a water releasing sight, and (g) controllably releasing the contained water from the retaining tank.

6. The method of claim 4 further comprising the step of venting the retaining tank as the water flows into the retaining tank.

7. A method of in situ testing of the water flow at the outlet valve of a building's emergency water system comprising the steps of:
    (a) providing a movable retaining tank having calibration means for measuring the quantity of water contained within the retaining tank;
    (b) coupling the retaining tank to the outlet valve;
    (b) opening the outlet valve to allow the flow of water therefrom;
    (c) containing the water flow within the retaining tank;
    (d) measuring the water within the retaining tank with the calibration means after a designated time period of water flow to determine the flow rate of the water flow.

8. The method of claim 7 further comprising the steps of (e) relocating the movable retaining tank to a water releasing sight, and (f) releasing the contained water from the retaining tank.

9. The method of claim 7 further comprising the step of venting the retaining tank as the water flows into the retaining tank.

10. A water flow testing system for determining the water pressure at the outlet valve of a building's water distribution system comprising:
    a retaining tank adapted to contain a volume of water therein;
    an inlet conduit coupled to said retaining tank;
    an outlet conduit coupled to said retaining tank, said outlet conduit having a control valve to control the flow of water from said retaining tank;
    a water flow measuring device coupled to said inlet conduit and an outlet end of an operational outlet valve, and
    a plurality of wheels coupled to said retaining tank,
    whereby the outlet valve is opened to allow a flow of water through the water measuring device and into the retaining tank at the location of the outlet valve, and whereby the retaining tank is then be moved to a draining location wherein the water within the retaining tank is released through the outlet conduit through actuation of the control valve.

11. The water flow testing system of claim 10 further comprising a vent.

12. The water flow testing system of claim 11 wherein said vent includes check valve means to prevent the flow of liquid therethrough.

* * * * *